United States Patent [19]
Saeki

[11] 3,745,438
[45] July 10, 1973

[54] HIGH VOLTAGE GENERATING DEVICE
[75] Inventor: Taiichi Saeki, Katano, Japan
[73] Assignee: Matsushita Electric Industrial Co., Ltd., Osaka, Japan
[22] Filed: July 18, 1972
[21] Appl. No.: 272,949

[30] Foreign Application Priority Data
July 22, 1971 Japan.................................. 46/65231

[52] U.S. Cl............................ 321/8 R, 178/DIG. 11
[51] Int. Cl................................................. H02m 7/00
[58] Field of Search................. 178/DIG. 11, 7.5 R; 321/2 HF, 8, 15

[56] References Cited
UNITED STATES PATENTS
| | | | |
|---|---|---|---|
| 2,985,812 | 5/1961 | Peterson | 321/15 |
| 3,225,258 | 12/1965 | Brekoo et al. | 321/15 |
| 2,823,347 | 2/1958 | Procter | 321/15 |
| 3,349,310 | 10/1967 | Ladoniczki | 321/8 R X |
| 3,571,650 | 3/1971 | Hofmeister et al. | 321/8 R |
| 3,657,632 | 4/1972 | Miyoshi | 321/8 R |

*Primary Examiner*—William M. Shoop, Jr.
*Attorney*—Richard K. Stevens, Robert J. Frank et al.

[57] ABSTRACT

A high voltage generating device used to obtain a high voltage supplied to the television receiver picture tube anode, comprising a high voltage coil generating an a-c voltage and having an output terminal connected to one end of a rectifier means whose other end is connected to a high voltage lead line, wherein the high voltage coil and rectifier are molded together with a resin. Thus, it can be readily manufactured and will be small in size, light in weight and excellent in insulation character.

10 Claims, 13 Drawing Figures

HIGH VOLTAGE GENERATING DEVICE

This invention relates to high voltage generating devices used to obtain d-c high voltage supplied to the anode of television receiver picture tubes.

In the usual d-c high voltage generating means, an a-c voltage is first generated and stepped up through a transformer, and the a-c high voltage generated in the high voltage coil of the transformer is rectified through a rectifying means to thereby obtain a d-c high voltage. For example, in the television receiver a d-c high voltage of about 10 to 30 KV is supplied to the anode of the picture tube. This voltage is obtained from flyback pulses generated from the horizontal deflection circuit by stepping up these pulses through the flyback transformer and rectifying the transformer output through a rectifying means. However, such high voltage generating means should use special parts for the stepping-up means and rectifying means because extremely high voltage is involved. Also, the insulation factor is very significant. Therefore, considerably large space is inevitably occupied.

In order to solve the above problems, it has been proposed to use solid-state rectifiers such as silicon rectifiers which are small in size but nevertheless have excellent breakdown voltage characteristic and excellent reliability. Also, in television receivers it has been proposed to have the high voltage resonate at harmonic frequency to obtain improved operational efficiency. In case of using solid rectifier means, however, it is necessary to ensure a considerably large space surrounding the rectifier, so that support means of a considerably large size is required to hold the rectifier sufficiently spaced from other parts. It has further been proposed to construct a multi-stage rectification block by combining a plurality of rectifying elements and a plurality of capacitors. In this case, the entire block is accommodated in a casing, and resin is charged into the casing to produce a molding which is subsequently attached to a chassis frame and connected to the high voltage coil. Again in this case, a considerably large space is necessary due to the plurality of capacitors.

An object of the invention is to provide a high voltage generating device, which can overcome the aforementioned drawbacks inherent in the prior-art high voltage generating device, and which is small in size, excellent in insulation character and capable of being readily manufactured.

For the invention to be more fully understood, it will now be described in conjunction with some embodiments of the high voltage generating device with reference to the accompanying drawings, in which.

Figure 3A:
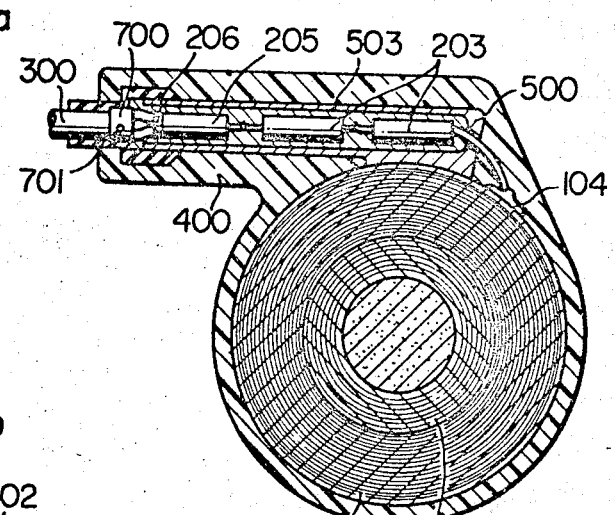
Figure 3B:
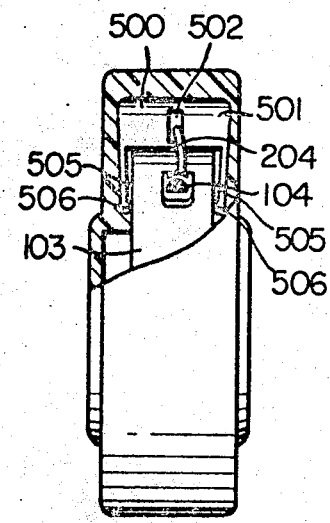
Figure 3C:
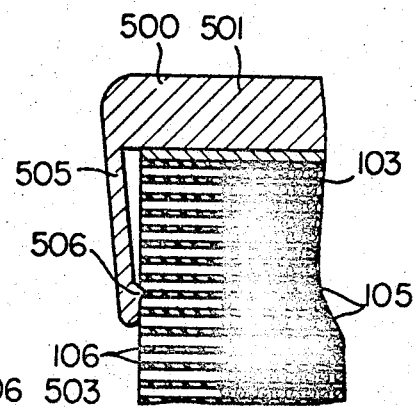
Figure 3D:
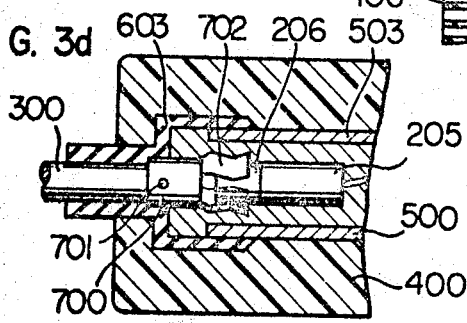
Figure 4A:
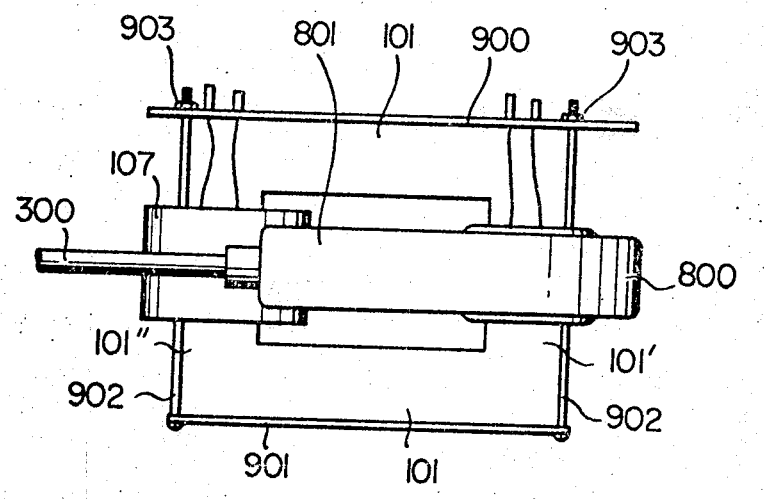
Figure 4B:
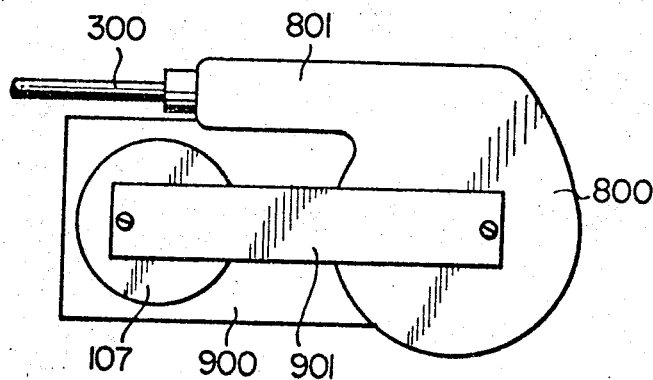

FIGS. 3a to 3d show a further embodiment of the high voltage generating device according to the invention, in sectional view in FIG. 3a, in partly sectional side view in FIG. 3b, in fragmentary sectional view to an enlarged scale in FIG. 3c and in fragmentary sectional view to an enlarged scale in FIG. 3d; and FIGS. 4a and 4b show a still further embodiment of the high voltage generating device according to the invention, in front view in FIG. 4a and in side view in FIG. 4b.

Figure 1A:
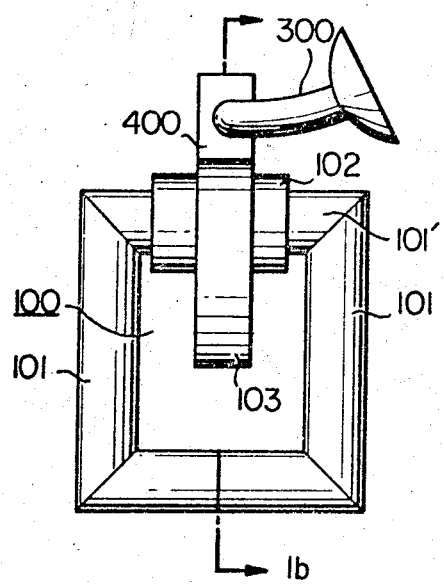
FIGS. 1a to 1c show an embodiment of the high voltage generating device according to the invention, in elevational view in FIG. 1a, in sectional view in FIG. 1b and in fragmentary sectional view to an enlarged scale in FIG. 1c.
Figure 1B:
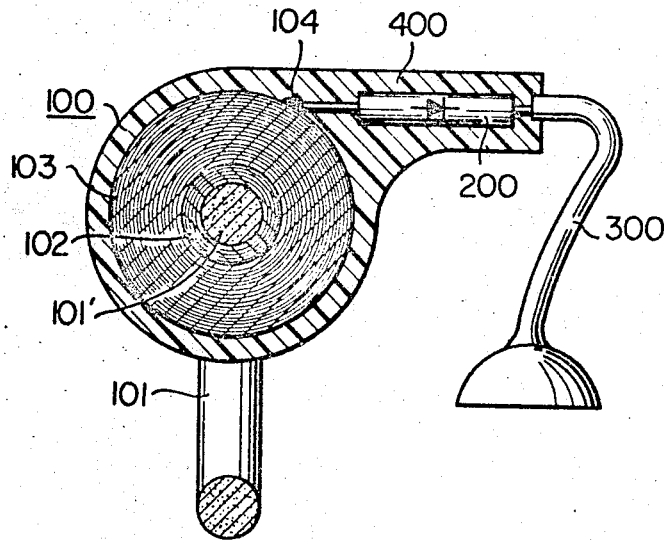
Figure 1D:
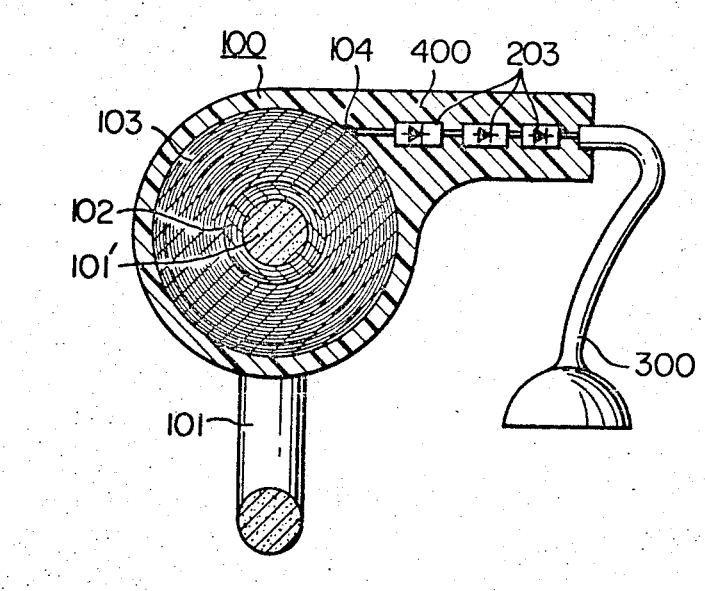
FIG. 1d is a view similar to FIG. 1b but showing a modification of the first embodiment.
Figure 1C:
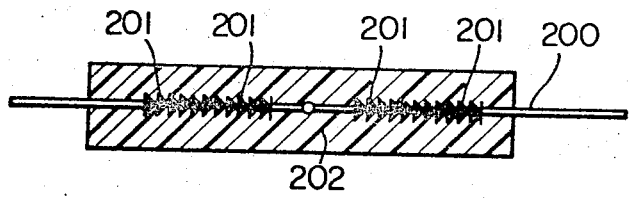

Referring now to FIGS. 1a to 1c, there is shown a high voltage generating device for television receivers embodying the invention. In the Figures, refrence numeral 100 designates a flyback transformer for stepping up flyback pulses, numeral 200 a rectifying means, a typical silicon rectifier, for rectifying the a-c high voltage output of the flyback transformer 100 into a d-c high voltage, numeral 300 a high voltage lead line for leading the d-c high voltage appearing at an output terminal of the rectifying means 200 to the anode electrode of the picture tube, and numeral 400 an insulating resin molding rigidly surrounding and insulating the high voltage coil 103 of the flyback transformer 100 and the rectifying means 200. The flyback transformer 100 includes a ferrite core 101 consisting of two sections assembled together into a frame-like form, a primary coil 102 wound on one leg 101' of the ferrite core 101 and connected to an output terminal of a television receiver horizontal deflection circuit, and the high voltage coil 103 wound on the outer periphery of the primary coil 102. The high voltage coil 103 has its inner end connected to the outer end of the primary coil 102 and its outer end provided with an end terminal 104. The rectifying means 200 has its one end connected to the end terminal 104 of the high voltage coil 103 and its other end connected to the high voltage lead line 300. In manufacture the high voltage coil 103 and rectifying means 200 connected in the above manner are held in position within a mold, and then the resin 400 in the fused stage is charged into the mold and solidified into a molding. In the above manner, the high voltage coil 103 and rectifying means 200 are rigidly integrated and permanently held in fixed relative positions with the surrounding resin 400. The high voltage generating device completed in the above menner is very compact and light in weight, and it does not include any mounting means for its attachment to a chassis frame. The rectifying means 200 may consist of a stack of many rectifying elements 201 serially connected as shown in FIG. 1c. Since these elements are buried in the rigid insulating resin molding 202, it is possible to meet the high breakdown voltage requirement. Alternatively, many rectifiers 203 may be connected in series as shown in FIG. 1d.

In operation, as flyback pulses are supplied to or generated by the primary coil 102, they are stepped up to generate an a-c high voltage of 10 to 30 KV $p-p$ at the end terminal 104 of the high voltage coil 103. The a-c voltage thus generated is rectifyed through the rectifying means 200 or 203 to obtain a d-c high voltage of 10 to 30 KV on the high voltage lead line 300.

As has been described, with the above high voltage generating device of FIGS. 1a to 1d where the high voltage coil 103 and rectifying means 200 or 203 are rigidly integrated with the surrounding insulating resin molding 400, there is no need of separately supporting the high voltage coil 103 and rectifying means 200 or 203 and connecting them with a long lead wire, thus dispensing with the separate support or mount means and long lead wire and permitting the obtaining of improved insulation characteristics and reduced size and weight. Also, since the end terminal 104 provided to the high voltage coil 103 and connecting lead leading therefrom through the rectifying means 200 or 203 are burried in the resin 400 and shielded from the outside, dust and moisture will never accumulated on them, so that the deterioration of the insulation character can be perfectly prevented. Further, by using incombustible resin such as epoxy resin for the resin molding 400, it is possible to obtain a high voltage generating device having excellent heat-resisting character.

Figure 2A:
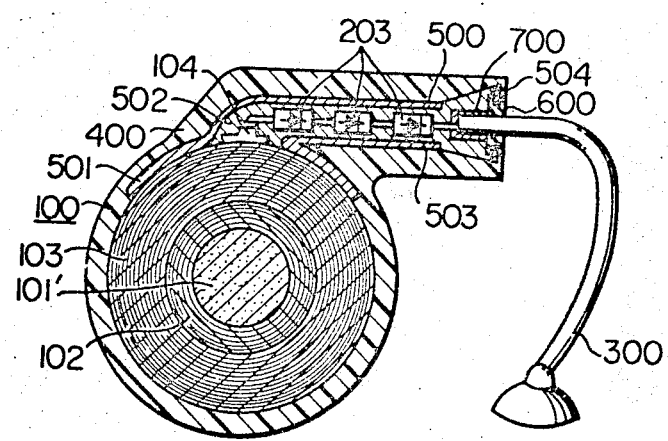
FIGS. 2a to 2c show another embodiment of the high voltage generating device according to the invention, in sectional view in FIG. 2a, in fragmentary perspective view showing part of the same under manufacture and in fragmentary sectional view to an enlarged scale showing part of the same under manufacture in FIG. 2c.
Figure 2B:
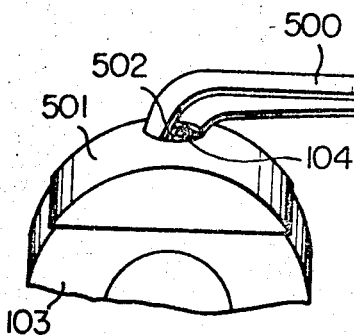
Figure 2C:
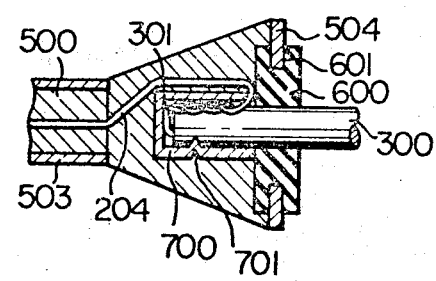

FIGS. 2a, 2b and 2c show another embodiment of the high voltage generating device. In this embodiment, a holder 500, a bushing 600 and a cap 700 are provided for the purpose of facilitating the holding of rectifying means 203 in a mold during manufacture and for ensuring firm and safe attachment of high voltage lead line 300. In case of the embodiment of FIGS. 1a to 1c, in charging the fused resin in the mold it is necessary to hold the rectifying means 200 or 203 and high voltage lead line 300 in their respective fixed positions such that they will not be readily moved by suitable support means or with strong lead wire incapable of ready bending for connecting the rectifying means 200 or 203. Such inconvenience encountered in manufacture may be reduced by providing means to aid the supporting of the rectifying means 203. Also, if the high voltage lead line 200 is directly supported by the hardened resin 400, it is likely to be damaged at its supported portion in such instances as when it is connected to or removed from the associated circuit. Therefore, it is desirable to provide a buffer means at this support portion.

As is most clearly shown in FIG. 2b, the holder 500 which is provided to the above ends includes a hat portion 501 covering the top of the high voltage coil 103 and formed with a central hole or aperture 502 for effecting the connection of the end terminal 104 of the high voltage coil 103 and the rectifying means 203. The hat portion 501 is integral with a channel-shaped portion 503, which is formed with a slot on one side for inserting the rectifying means 203 and terminates at the end remote from the hat portion 501 in a bushing support portion 504 formed with an aperture. Fitted to the bushing support portion 504 is the bushing 600, which is made of rubber and has a peripheral annular groove 601 and a central hole or aperture 602.

In the manufacture of the high voltage generating device of this embodiment, the rectifying means 203 is inserted into the channel-shaped portion 503 through the side slot thereof, and its one end is connected to the end terminal 104 of the high voltage coil 103, as shown in FIG. 2a. The high voltage lead line 300 is supported by inserting its end portion through the aperture 602 in the bushing 600, subsequently twisting together its lead wire 301 and the counterpart lead wire 204 of the rectifying means 203 and fitting the metal cap 700 on the inserted end of the high voltage lead line 300, and finally caulking a portion 701 of the cap to drive it into the material of the high voltage lead line 300, as is clearly shown in FIG. 2c. Thereafter, the high voltage coil 103, rectifying means 203, holder 500, bushing 600 and cap 700 are integrally covered with the resin 400.

As is shown, with the above holder 500 the rectifying means 203 can be readily held in position to facilitate the manufacture. Also, since the high voltage lead line 300 is supported by the resin molding 400 via the bushing 600, its supported portion will not be damaged in such instances as when it is bent or otherwise treated. Further, since the high voltage lead line 300 is anchored with part of the cap 700 driven into it, it will not slip off the bushing 600 but will remain firmly and safely supported even if external pulling force is supplied to it.

FIGS. 3a to 3d show a further embodiment of the high voltage generating device, which incorporates certain improvements over the previous embodiments FIGS. 2a to 2c. A first improvement lies in the hat portion 501 of the holder 500 attached to the high voltage coil 103. More particularly, the hat portion 501 is provided on opposite sides with downwardly extending leg portions 505, which are further provided at their end with respective inward protuberances 506. Thus, the holder 500 may be attached to the high voltage coil 103 such that the coil 103 is clamped between the two leg portions 505 of the holder, with the protuberances 506 squeezed between adjacent insulation layers 106 insulating the conducting wire 105 of the coil 103. The leg portions 505 of the holder 500 may have any desired shape so long as they face each other such that the high voltage coil 103 can be clamped between them. With the inward protuberances 506 provided to the facing leg portions, the holder may be more firmly and stably fixed in position. This effect may further be enhanced by forming the protuberance 506 as an arcular ridge similar to the arc defined by the insulation layers 106 so that its entire length may be wedged in between the adjacent insulation layers. In this way, the holder 500 may be readily and stably fitted on the high voltage coil 103 at the exact position for the temporary attachment. Besides, by so doing the molding work for molding the resin 400 may be efficiently done. Thus, it is possible to obtain a high voltage generating device of excellent performance with the holder 500 located at correct position.

A second improvement is incorporated where the rectifying means 205 and high voltage lead line 300 are connected together. More particularly, the rectifying means 205 is provided at one end with a connector 206, while the cap 700 is provided at its end remote from the high voltage lead line 300 with a plurality of radially spaced resilient metal tongues 702. The cap 700 is caulked to the high voltage lead line 300, and the tongues 702 are fitted on the connector 206 of the rectifying means 205. With this construction, the connection of high voltage lead line 300 and rectifying means 205 may be done very easily. Furthermore, in this embodiment the bushing 603 is fitted on the channel-shaped portion 503 of the holder 500.

FIGS. 4a and 4b show a high voltage generating device of the above described construction and most effectively incorporating a frame-like core 101. In this high voltage generating device, a high voltage generating block 800 containing primary coil 102, high voltage coil 103 and rectifying means 200, 203 or 205 all burried in a resin molding 400 is mounted on one leg 101' of the core assembled into a frame-like form, with the high voltage lead wire 300, that is, an elongate molding portion 801 containing the rectifying means 200, 203 or 205 extending toward the opposite leg 101''. The core 101 includes a terminal plate 900 and a keep plate 901 assembled together with bolts 902 and nuts 903.

Also, a coil 107 for a different purpose may be mounted on the opposite leg 101''. With the above construction in which the elongate molding portion 801 of the high voltage generating block 800 containing the rectifying means 200, 203 or 205 extends toward the opposite leg 101'', the required spaced may be minimized. Also, the elongate portion 801 is less likely to be damaged.

What we claim is:

1. A high voltage generating device comprising a high voltage coil generating an a-c voltage, a rectifying means connected at one end of said high voltage coil, and a high voltage lead line connected to the other end of said rectifying means, and an outermost cover block of molded resin for containing therein and rigidly uniting therewith said high voltage coil, said rectifying means and the end portion of said high voltage lead line being connected to said rectifying means.

2. A high voltage generating device comprising:
a high voltage coil generating an a-c voltage; a rectifying means connected at one end to said high voltage coil; a high voltage lead line connected to the other end of said rectifying means, said high voltage coil, said rectifying means and an end portion of said high voltage lead line all being rigidly integrated with a surrounding resin in the form of a molding; and a holder used to accommodate and hold in position said rectifying means and attached to said high voltage coil.

3. A high voltage generating device according to claim 2, wherein said holder is provided with two leg portions facing each other for pinching said high voltage coil.

4. A high voltage generating device according to claim 3, wherein said two leg portions are provided with respective inward protuberances adapted to be wedged in between adjacent insulation layers of said high voltage coil.

5. A high voltage generating device comprising: a high voltage coil generating an a-c voltage; a rectifying means connected at one end to said high voltage coil; a high voltage lead line connected to the other end of said rectifying means, said high voltage coil, said rectifying means and an end portion of said high voltage lead line all being rigidly integrated with a surrounding resin in the form of a molding; and a bushing provided in a boundary zone between said high voltage lead line and the sourrounding resin.

6. A high voltage generating device according to claim 5, which further includes a metal cap fitted on the end portion of said high voltage lead line and engaging said bushing.

7. A high voltage generating device according to claim 6, wherein said metal cap is provided with a connector means fitted on a counterpart connector of said rectifying means.

8. A high voltage generating device comprising a high voltage coil generating an a-c voltage, a holder holding a rectifying means in position, said holder being fitted on said high voltage coil and having an elongate channel-shaped portion terminating in a bushing support portion, a rectifying means extending within said channel-shaped portion of said holder and having one end connected to said high voltage coil, a bushing fitted to said bushing support portion of said holder, a high voltage lead line having one end inserted through said bushing and connected to the other end of said rectifying means, and a metal cap fitted on said one end of said high voltage lead line and engaging said bushing, said high voltage coil, said holder, said rectifying means, said bushing and said metal cap all being rigidly integrated with a surrounding resin in the form of a molding.

9. A high voltage generating device comprising a high voltage coil generating an a-c voltage, a holder to hold a rectifying means in posittion, said holder being attached to said high voltage coil and having an elongate channel-shaped portion and two leg portions facing each other for pinching said high voltage coil, a bushing fitted on an end of said holder remote from said high voltage coil, a rectifying means extending within said channel-shaped portion of said holder and having one end connected to said high voltage coil, a high voltage lead line having one end inserted through said bushing, and a metal cap fitted on said one end of said high voltage lead line and provided at the end remote from said high voltage lead line with a connector means fitted on a counterpart connector of said rectifying means, said high voltage coil, said holder, said bushing, said rectifying means and said metal cap all being rigidly integrated with a surrounding resin in the form of a molding.

10. A high voltage generating device including a high voltage generating block containing a high voltage coil generating an a-c voltage, a rectifying means having one end connected to said high voltage coil and a high voltage lead line having one end connected to the other end of said rectifying means, said high voltage coil, said rectifying means and an end portion of said high voltage lead line all being rigidly integrated with a surrounding resin in the form of a molding, said high voltage generating block being mounted on one leg of a frame-like core such that said high voltage lead line extends from said molding toward a leg opposing said first-mentioned leg of said core.

* * * * *